Dec. 17, 1940.   G. A. WALKER   2,225,326
METAL CUTTING TOOL
Filed Oct. 7, 1939
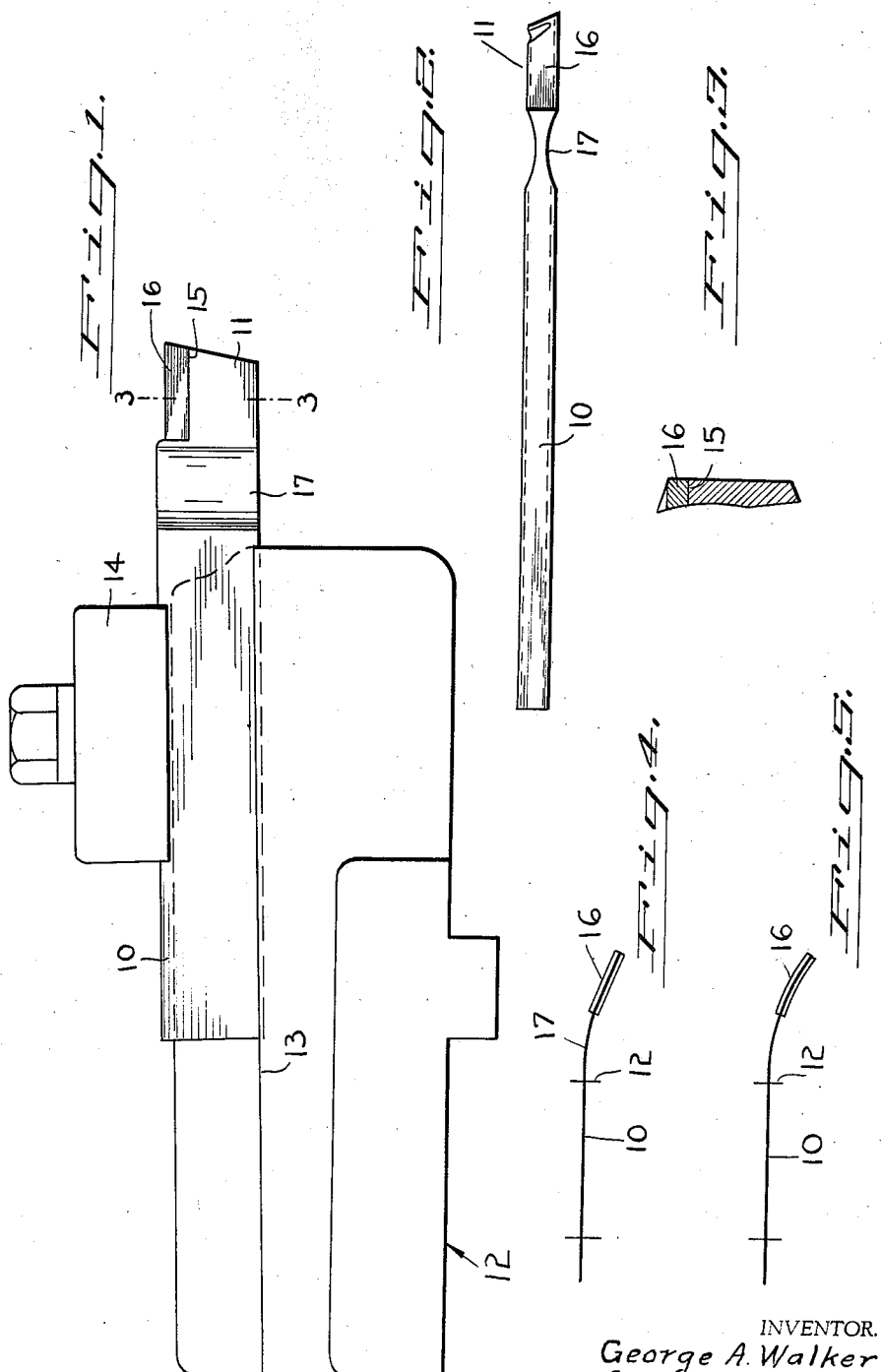
INVENTOR.
George A. Walker
BY
ATTORNEY.

Patented Dec. 17, 1940

2,225,326

UNITED STATES PATENT OFFICE 2,225,326

METAL CUTTING TOOL

George A. Walker, Arlington, N. J., assignor to Pollak Manufacturing Company, Arlington, N. J., a corporation of New Jersey Application October 7, 1939, Serial No. 298,367

4 Claims. (Cl. 29—96)

The invention relates to metal cutting tools and has more particular reference to a tool known as a cut off blade for use on screw machines, or lathes. Tools of this character are used in the last operation or what might be termed the cutting off of the stock after the machined part has been formed.

Such tools must be rugged in construction and accurate and efficient in operation as it is essential that a clean cut be made. Numerous difficulties have been encountered in setting up the present type of tools, and also in the fact that only a short run is obtained before it is necessary to stop the machine and dress or sharpen the tool.

In accordance with the present invention the tool is tipped with an extremely hard cutting material made of high speed alloys composed principally of some material on the order of tungsten carbide. One material that has been used with great success by applicant is known to the trade as "Carboloy."

Due to its extreme hardness this material is what might be termed brittle and non-elastic. In the operation of the screw machine excessive strains are placed on the cut off blade and its cutting edge. There naturally is a slight tendency for the stock in the blade to bend. While this so called bend would not be sufficient to materially affect the accuracy of the work it would, due to the difference of the coefficient of elasticity in the high speed cutting material and the stock of the blade cause the high speed cutting material to crack, thus rendering it useless.

The principal object of the present invention is to provide an exceedingly simple means for overcoming this serious difficulty. This means comprises broadly the provision of a weakened part in the blade shank between its point of support and the insert of high speed cutting alloy.

Other objects and advantages will become apparent as this specification proceeds. Referring to the drawing forming a part thereof and in which one form of the invention has been illustrated:

Fig. 1 is a side elevation showing the improved tool in a holder;

Fig. 2 is a top plan view of the tool;

Fig. 3 is a sectional view taken on line 3—3 of Fig. 2; and

Figs. 4 and 5 are diagrammatic views.

Referring again to said drawing the cut off blade comprises a stock having a shank portion 10 and a forward end portion 11. The shank portion 10 may be approximately rectangular in cross section or as indicated in Fig. 3 the sides may have a slight slope and the top and bottom edges be somewhat beveled. The shank 10 is attached to a fixture or other part of a metal working machine. As illustrated this fixture comprises a holder 12 having a suitable seat 13 for the blade and a retaining block 14.

The forward end portion 11 has a cut-out or notch 15 to accommodate a small block of high speed cutting material 16 which may be secured in place by silver solder or other known means. The insert provides the cutting edge for the tool.

Between the insert 16 and the point of support of the tool in its operating position a weakened area 17 is provided. As illustrated this weakened area is formed by running annular cutters in on both sides so as to give a waist-like form to the tool in this region, thus forming what might be termed an elastic or flexible area 17. It will be noted the flexibility or elasticity is parallel to the axis of the rotating work. Thus the rigidity of the tool is not materially affected as far as actual working conditions are concerned, as positively no movement of the tool is permitted in a direction normal or at right angles to the axis of the rotating work.

As heretofore mentioned the high speed cutting element is extremely hard and less elastic than the shank and forward end of the blade. In common practice side strains developing at the region of the tip or insert when the tool is in work cause a flexing or bending condition which inevitably results in cracks or breakage of the high speed cutting element, thus ruining the common type of tool.

Particular attention is drawn to Figs. 4 and 5 in which Fig. 4 is a diagram showing the theoretical result with a tool made in accordance with the invention and Fig. 5 is a diagram of a tool made without the weakened portion. These figures are naturally very much exaggerated and in each of them the support or holder is designated 12, the tool 10 and the insert or high speed cutting element 16. In Fig. 4 it will be noted all the bend or flexing takes place in the weakened portion 17 and the high speed cutting element has a straight rigid support. In Fig. 5 the bend takes place from the support or holder 12 to the end of the tool thus causing the blade to bend more than the high speed cutting element with the result of the high speed cutting element cracking.

The tool is easily dressed or sharpened and it has been found in practice to have many times the fatigue value of other known tools for its particular purpose. It has also been found that a tool built in accordance with the invention may be of narrower width than other inserted type of tools ordinarily used for the cutting off operations. This is of vital importance as it effects a very substantial saving of stock, since, in the cutting off operation the amount of stock wasted is equivalent to the width of the cutting blade.

Such changes in details of construction as would occur to one skilled in the art are to be considered as coming within the spirit of the invention as defined in the appended claims.

I claim:

1. A cut-off blade having a cutting edge formed of an insert of high speed cutting material, and a weakened portion formed in the shank of said blade, said weakened portion providing for flexibility of the blade at right angles to the axis thereof and being located between the point of support for said blade in its working position and said insert of high speed cutting material.

2. A cut-off blade having a cutting edge formed of an insert of high speed cutting material, the coefficient of elasticity being greater in the shank of said blade than in the insert of high speed cutting material, and a weakened portion formed in the shank of said blade for providing flexibility of the blade at right angles to the axis thereof, said weakened portion being located behind and adjacent to said insert so as to permit of any bending of the blade taking place in said weakened portion.

3. A cut-off blade having an insert of high speed cutting material in its upper forward portion, and a weakened portion of waist-like formation in the sides of the shank of said blade and in front of the point of support of said blade in its working position.

4. A cut-off blade having an insert of high speed cutting material in its upper forward portion, hollowed out areas in the shank of said blade coextensive with either side thereof so as to form a weakened portion of wast-like formation, said weakened portion being located between the point of support for said blade in its working position and said insert of high speed cutting material.

GEORGE A. WALKER.